United States Patent [19]

Krueger et al.

[11] 4,128,492

[45] Dec. 5, 1978

[54] PROCESS OF PRODUCING A CYCLOHEXANE-1,2,3,4-TETRACARBOXYLIC ACID-CONTAINING SCALE INHIBITOR

[75] Inventors: Friedrich Krueger, Edingen; Dieter Palleduhn, Mannheim, both of Fed. Rep. of Germany

[73] Assignee: Joh. A. Benckiser GmbH, Ludwigshafen am Rhein, Fed. Rep. of Germany

[21] Appl. No.: 862,538

[22] Filed: Dec. 20, 1977

[30] Foreign Application Priority Data

Dec. 21, 1976 [DE] Fed. Rep. of Germany ....... 2657775

[51] Int. Cl.$^2$ ............................................. C02B 5/06
[52] U.S. Cl. ................................. 252/180; 252/89 R; 252/DIG. 11; 562/497; 562/509
[58] Field of Search ............... 252/180, 175, DIG. 11, 252/89 R; 260/514 K; 210/58

[56] References Cited

U.S. PATENT DOCUMENTS

| | | | |
|---|---|---|---|
| 3,459,670 | 8/1969 | Carter | 252/99 |
| 3,784,469 | 1/1974 | Krueger et al. | 252/180 X |
| 4,043,930 | 8/1977 | Krueger et al. | 260/514 K X |

*Primary Examiner*—Harris A. Pitlick
*Attorney, Agent, or Firm*—Bacon & Thomas

[57] ABSTRACT

A preparation for inhibiting scale formation in aqueous media with a high threshold activity is prepared by condensation of 2 moles of a mixture of acetic acid anhydride and an acetylhalide in the proportion of 0.2:1.8 to 1.8:0.2 with 0.6 moles to 1 mole crotonaldehyde, thereafter with 0.6 moles to 1 mole of acrylic acid, followed by condensation with 0.6 moles to 1 mole of maleic acid anhydride, and finally by oxidation with nitric acid without isolating any of the resulting intermediate products. Said preparation is added in amounts of 10 mg. to 200 mg. to each liter of aqueous medium to exert its scale formation inhibiting, chelating, sequestering, and/or complexing effect.

13 Claims, No Drawings

PROCESS OF PRODUCING A CYCLOHEXANE-1,2,3,4-TETRACARBOXYLIC ACID-CONTAINING SCALE INHIBITOR

BACKGROUND OF THE INVENTION (1) Field of the Invention

The present invention relates to a novel and highly advantageous process of inhibiting scale formation in aqueous media and more particularly to such a process by using a preparation containing cyclohexane-1,2,3,4-tetracarboxylic acid obtained in a simple and highly economical manner, to a process of producing such a preparation, and to a composition containing said cyclohexane-1,2,3,4-tetracarboxylic acid.

(2) Description of the Prior Art

It is known to add to aqueous media polyphosphates and/or, more recently, phosphonic acids in order to prevent precipitation of alkaline earth metal ions. See German Published Applications No. 1,216,471 and No. 1,469,253. Phosphonic acids are in general preferred over polyphosphates because they are stable against hydrolysis and, therefore, retain their effectiveness even in acid or alkaline media. It is also known that, when using phosphonic acids, it is sufficient to add substoichiometric amounts in order to keep in solution the hardness-forming agents of water. This use of substoichiometric amounts is generally known as threshold effect or also as "seed effect" (see Ralson in "Journal Petroleum Technology" volume 21 (1969), page 1029 to 1036).

Since nitrogen- and phosphorus-containing agents have been held responsible for eutrophication of rivers, lakes, and, in general, of bodies of water, many attempts have been made to find new compounds with threshold activity which are free of nitrogen and phosphorus.

Heretofore, two classes of compounds containing neither nitrogen nor phosphorus which are effective in substoichiometric amounts have become known. These compounds are either polymers of the most varied composition as described by Elliot in "Desalination" Vol. 8 (1970), pages 221 to 236 and, on the other hand, modified polysaccharides, for instance, starches which have been degraded by acid means or by oxidation. See, for instance, German Pat. No. 1,810,571 and German Published Application No. 1,925,235.

Both types of seed substances, however, are effective only in higher concentrations than those in which the phosphonic acids are employed.

Furthermore, it is known that cyclohexane-1,2,3,4,5-pentacarboxylic acid has such a threshold activity (see German Published Application No. 2,132,802).

SUMMARY OF THE INVENTION

It is one object of the present invention to provide a simple and effective method of inhibiting scale formation in aqueous media by the addition of specific nitrogen- and phosphorus-free agents, preferably in threshold amounts.

Another object of the present invention is to provide a composition for inhibiting scale formation in aqueous media, said composition containing a polycarboxylic acid preparation produced in a specific manner.

A further object of the present invention is to provide a process of producing such a highly effective polycarboxylic acid preparation which is capable of inhibiting scale formation is threshold amounts.

Other objects of the present invention and advantageous features thereof will become apparent as the specification proceeds.

In principle, the present invention is based on the observation that cyclohexane-1,2,3,4-tetracarboxylic acid has an excellent scale formation inhibiting effect, especially in neutral medium. However, to use said polycarboxylic acid for this purpose was not possible heretofore because it can be produced only with great difficulty by a highly uneconomical process.

According to the known processes cyclohexane-1,2,3,4-tetracarboxylic acid is produced by reacting 1,3-cyclohexadiene with maleic acid anhydride followed by oxidation of the resulting bicyclo-(2,2,2)-octene(7)-2,3-dicarboxylic acid anhydride (see "Annalen" vol. 571(1951), page 153). This process, however, is technically not feasible because the starting material, the 1,3-cyclohexadiene, is not availabe on a large scale.

Another possibility of producing cyclohexane-1,2,3,4-tetracarboxylic acid would be the oxidation of bicyclo-(2,2,2)-octene(7)-1,2,3-tricarboxylic acid-2,3-anhydride. This anhydride, however, can be produced only with a very low yield according to "Annalen" vol. 565 (1949), pages 148 et seq. by reacting 1-acetoxy butadiene and acrylic acid followed by condensation of the resulting 2-acetoxy-1,2,5,6-tetrahydrobenzoic acid with maleic acid anhydride.

In contrast thereto, a seed preparation for inhibiting scale formation in aqueous media which is effective in threshold amounts and which contains cyclohexane-1,2,3,4-tetracarboxylic acid is obtained according to the present invention without requiring isolation of intermediate products by condensing 2 moles of a mixture of acetic acid anhydride and an acetylhalide, preferably acetylchloride, in a proportion of 0.2:1.8 to 1.8:0.2 with 0.6 moles to 1 mole of crotonaldehyde and adding thereto 0.6 moles to 1 mole of acrylic acid and subsequently 0.6 moles to 1 mole of maleic acid anhydride. The resulting condensation product is then oxidized with nitric acid.

It is highly surprising that the resulting preparation according to the present invention has a seed effect which fully corresponds to the seed effect of the pure cyclohexane-1,2,3,4-tetracarboxylic acid. This is the more surprising because it is known from the literature and has been confirmed by respective experiments that the intermediate products formed during the condensation reaction are produced only in a low yield and because thus it could not be expected that the preparation according to the present invention would contain sufficiently large amounts of cyclohexane-1,2,3,4-tetracarboxylic acid; for it is not possible to isolate the cyclohexane-1,2,3,4-tetracarboxylic acid in a high yield from the condensation reaction products prepared according to this invention. The thin layer chromatogram, however, shows that the tetracarboxylic acid is present therein as the principal component.

In order to produce the highly effective, scale formation inhibiting preparation according to the present invention, there are reacted acetic acid anhydride, an acetyl/halide, preferably acetyl chloride, and crotonaldehyde in the presence of a polymerization preventing agent, preferably hydroquinone, and of a catalyst, preferably p-toluene sulfonic acid, while stirring and slightly heating the reaction mixture. Without isolating any reaction products acrylic acid is added and the reaction mixture is heated under reflux at a temperature exceeding 100° C. and preferably at a temperature between about 120° C. and about 140° C. Again without isolating intermediate products, there is added maleic acid anhydride and the reaction mixture is heated to a temperature exceeding 100° C. and preferably to a temperature between 150° C. and 160° C. Subsequently, the cooled reaction mixture is oxidized with nitric acid in the presence of a catalyst, preferably of ammonium vanadate ($NH_4VO_3$).

The resulting condensation product exhibits an excellent stabilizing effect, especially at the inherent pH-value of water. Therefore, it is especially useful for stabilizing the water hardness in cooling cycle systems.

That the preparation produced according to the present invention has an excellent hardness stabilizing effect, when compared with pure cyclohexane-1,2,3,4-tetracarboxylic acid, is shown by the following comparative tests:

To carry out these tests, 2.0 mg. of the preparation according to the present invention are added in 100 cc. of water of a known hardness. The mixture is adjusted to a pH-value of 7.0 and is kept in a warming cabinet at 80° C. for 16 hours. It is then filled up with distilled water to a volume of 100 cc. and filtered through a doubled folding filter. The residual hardness is then determined in the filtrate and is calculated as mval. alkaline earth ions per liter in accordance with the provisions of DIN 19 640 (1 mval. of alkaline earth ions corresponding to 2.8° German hardness).

Table

| No of test | Product used | mval. of alkaline earth ions | inhibition in percent |
| --- | --- | --- | --- |
| 1 | Cyclohexane-1,2,3,4-tetracarboxylic acid (pure) | 6.2 | 92.0 |
| 2 | " | 6.3 | 92.5 |
| 3 | Preparation according to Example 1 | 6.2 | 92.6 |
| 4 | Preparation according to Example 2 | 6.1 | 90.2 |

The preparation obtained according to the prevent invention has also excellent sequestering, i.e. complex-forming properties with respect to bivalent and polyvalent metal ions, such as, for instance, calcium, magnesium, iron, copper, manganese, and other ions. It can be incorporated in solid and liquid compositions which are to be added to aqueous media. The preparation according to the present invention is also compatible with the conventional raw materials used in laundering and cleaning preparations and can be added to detergents and cleaning agents. The use, for instance, in automatic bottle rinsing machines and for cleaning tanks and containers has also proved to be of advantage.

DESCRIPTION OF THE PREFERRED EMBODIMENTS

The following examples serve to illustrate the present invention without, however, limiting the same thereto.

EXAMPLE 1

204 g. (2 moles) of acetic acid anhydride,
157 g. (2 moles) of acetyl chloride,
140 g. (2 moles) of crotonaldehyde,
0.8 g. of hydroquinone, and
2 g. of p-toluene sulfonic acid
are mixed and the mixture is stirred at room temperature. The temperature of the reaction mixture increases slowly to about 70° C. As soon as the temperature starts to decrease, stirring is continued for one more hour. Thereafter, 144 g. (2 moles) of acrylic acid
are added and the mixture is stirred under reflux in an oil bath of 140° C. for 2 hours. After cooling to about 80° C.

196 g. (2 moles) of maleic acid anhydride
are added and the resulting mixture is again stirred under reflux in an oil bath of 150° C. for 2 hours.

1000 g. of a 50% nitric acid (containing 1 g. of ammonium vanadate dissolved therein)
are added drop by drop to the resulting brown reaction solution which partly crystallizes after standing for some time. Initially the temperature increases considerably and the speed of addition of the nitric acid is regulated in such a manner that the oxidation takes place at a temperature between 80° C. and 90° C. without external heat supply. In this manner the nitric acid is added to the reaction solution within about 5 hours to 6 hours. Nitrous gases develop during said oxidation. After all the nitric acid has been added, the oxidation mixture is heated in a water bath of 80° to 90° C. for one more hour. After cooling, the reaction mixture is diluted with 3 liters of distilled water. An insoluble flaky precipitate of about 20 g. is filtered off and the filtrate is concentrated to dryness by evaporation in a vacuum.

Yield: 440 g. to 450 g. of a dark brown sirup which solidifies on cooling. After dissolving said sirup in the required amount of water, the resulting solution can be used as such for inhibiting scale formation in aqueous media.

EXAMPLE 2

The procedure is the same as described in Example 1. However, the following amounts of reactants are used:
367 g. (3.6 moles) of acetic acid anhydride,
31.5 g. (0.4 moles) of acetyl chloride,
140 g. (2.0 moles) of crotonaldehyde,
144 g. (2.0 moles) of acrylic acid,
118 g. (1.2 moles) of maleic acid anhydride,
0.8 g. of hydroquinone, and
2.0 g. of p-toluene sulfonic acid.

A seed preparation of the same excellent threshold effectiveness as that of the preparation produced according to example 1 is obtained thereby.

As stated above, the preparations according to the present invention are very soluble in water. Due to their excellent complexing, chelating, and/or sequestering properties, they can be employed with advantage in all those instances where a satisfactory sequestering, chelating, and/or complexing power is required. Thus they can be added to all aqueous media containing compounds which cause hardness of the water, which have a disturbing effect and/or in which the influence of polyvalent metal ions is to be eliminated. More particularly, they have proved to be of considerable value as water softening agents in the processing of hard water, as additives to baths used for the treatment of textiles, in the paper manufacture, in tanning baths, as additives to cleaning solutions, for instance, for cleaning and rinsing bottles, milk cans, and the like containers, for cleaning, stripping, and stain removal in textile processing, for instance, as levelling agents, in dye baths, for instance, to prevent color distortion by metal impurities, as additive to alkaline baths for treating fiber materials composed of or containing native cellulose such as cotton to inhibit degradation of the cellulose chain, in peroxide bleaching baths as stabilizers, and for many other purposes in which complexing, chelating, and sequestering agents are used.

The following additional examples illustrate the manner in which the preparations according to the present invention can be employed without, however, limiting their usefulness to said examples.

EXAMPLE 3

Treatment of Water Used for Sterilization of Cans

Tin-plated cans are placed into a 10 liter autoclave. Tap water of the following composition is used for sterilization of the cans:

Total Hardness 25° (German degree of hardness),
carbonate hardness 17° (German degree of hardness),
chlorides 53 mg./liter,
sulfates 85 mg./liter,
free carbon dioxide 43 mg./liter,
bound carbon dioxide 125 mg./liter,
pH-value 7.2.

10 cc. of an aqueous solution containing 200 mg. of the sirup obtained according to Example 1 are added to the tap water. Sterilization is effected by heating to 140° C. at about 4 atmospheres gauge. Addition of the preparation according to Example 1 inhibits scale and deposit formation on the sterilized cans and on the walls of the autoclave.

In a similar manner there are prepared
solid or liquid detergent and cleansing compositions,
detergent and cleansing compositions for dish washing machines,
household dry bleaching agents or
other compositions containing the new agents for inhibiting scale formation is aqueous media.

Of course, many changes and variations in the amounts of reactants used, in the reaction conditions, temperature, and duration, in the manner of applying and using the preparations according to the invention, and the like may be made by those skilled in the art in accordance with the principles set forth herein and in the claims annexed hereto.

We claim:

1. In a process of producing a highly effective agent for inhibiting scale formation is aqueous media, said agent containing cyclohexane-1,2,3,4-tetracarboxylic acid, the steps which comprise
   (a) condensing 2 moles of a mixture of acetic acid anhydride and an acetylhalide in the proportion of 0.2:1.8 to 1.8:0.2 with 0.6 moles to 1 mole of crotonaldehyde in the presence of a polymerization inhibiting agent and a condensation catalyst, while stirring and slightly heating the condensation mixture,
   (b) adding thereto 0.6 moles to 1 mole of acrylic acid, heating the mixture under reflux to a temperature exceeding 100° C.;
   (c) adding to the resulting condensation mixture 0.6 moles to 1 mole of maleic acid anhydride, again heating the mixture to a temperature exceeding 100° C., and
   (d) finally adding nitric acid thereto to cause oxidation thereof, said reaction steps being carried out without isolating any of the resulting intermediate products.

2. The process according to claim 1, in which there are employed hydroquinone as polymerization inhibiting agent, p-toluene sulfonic acid as condensation catalyst, and ammonium vanadate as oxidation catalyst.

3. The process according to claim 1, in which reaction of the initial condensation product with acrylic acid is carried out under reflux at a temperature of about 120°–140° C. while the reaction after addition of the maleic acid anhydride is carried out under reflux at a temperature of 150°–160° C. and the oxidation reaction with nitric acid is carried out without external heat supply whereby addition of nitric acid is adjusted so that the oxidation is effected at a temperature between about 80°–90° C.

4. The process according to claim 2, in which reaction of the initial condensation product with acrylic acid is carried out under reflux at a temperature of about 120°–140° C. while the reaction after addition of the maleic acid anhydride is carried out under reflux at a temperature of 150°–160° C. and the oxidation reaction with nitric acid is carried out without external heat supply whereby addition of nitric acid is adjusted so that the oxidation is effected at a temperature between about 80°–90° C.

5. The process according to claim 1, in which the resulting oxidation mixture is cooled, diluted with water, filtered to remove insoluble precipitate, and is concentrated to dryness by evaporation in a vacuum.

6. The process according to claim 1, in which nitric acid of a concentration between 25% and 65% is used as oxidizing agent.

7. A preparation for preventing scale formation in aqueous media, said preparation containing in aqueous solution cyclohexane-1,2,3,4-tetracarboxylic acid and other components, said preparation being obtained by the process of claim 1.

8. The preparation according to claim 7, said preparation being obtained by the process of claim 2.

9. The preparation according to claim 7, said preparation being prepared according to the process of claim 3.

10. The preparation according to claim 7, said preparation being prepared according to the process of claim 4.

11. The preparation according to claim 7, said preparation being prepared according to the process of claim 5.

12. The preparation according to claim 7, said preparation being prepared according to the process of claim 6.

13. In a method of inhibiting scale formation in an aqueous medium, the step which comprises adding to the aqueous medium the preparation obtained according to claim 1 in an amount of about 10 to about 250 mg. per liter of aqueous medium.

* * * * *